Feb. 11, 1964   J. E. MADDEN   3,120,709
SURFACE LAUNCH TEST VEHICLE
Filed Sept. 8, 1961   3 Sheets-Sheet 1

INVENTOR
Joseph E. Madden
BY
ATTORNEYS

Feb. 11, 1964

J. E. MADDEN 3,120,709

SURFACE LAUNCH TEST VEHICLE

Filed Sept. 8, 1961

INVENTOR
Joseph E. Madden

BY

ATTORNEYS

Feb. 11, 1964 J. E. MADDEN 3,120,709
SURFACE LAUNCH TEST VEHICLE
Filed Sept. 8, 1961 3 Sheets-Sheet 3
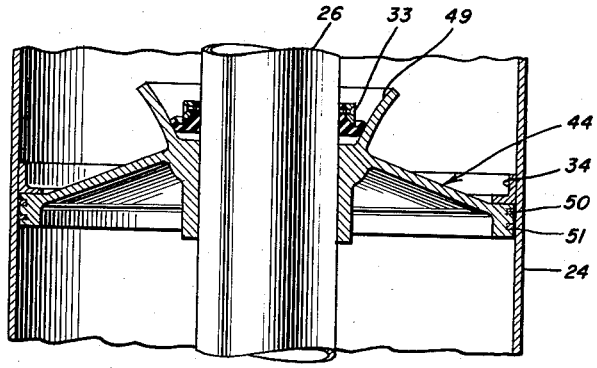
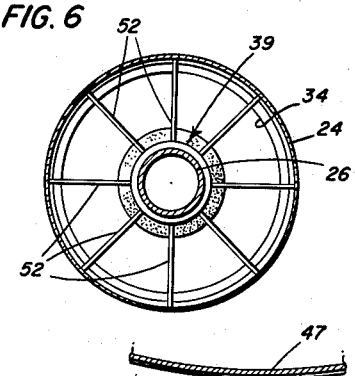
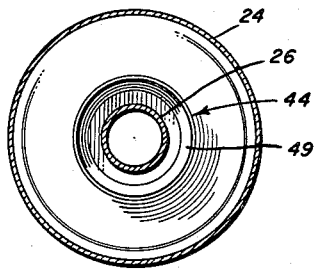
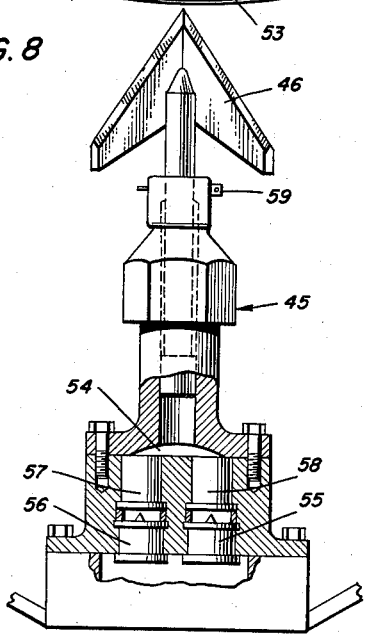
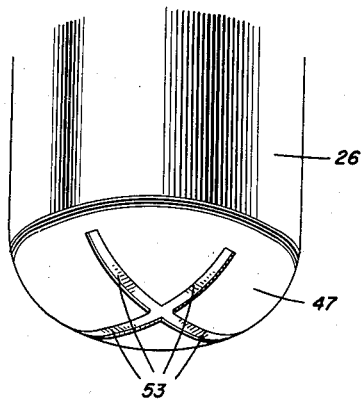
INVENTOR
Joseph E. Madden
BY
ATTORNEYS United States Patent Office 3,120,709
Patented Feb. 11, 1964

3,120,709
SURFACE LAUNCH TEST VEHICLE
Joseph E. Madden, Mountain View, Calif., assignor, by mesne assignments, to the United States of America as represented by the Secretary of the Navy
Filed Sept. 8, 1961, Ser. No. 136,962
12 Claims. (Cl. 35—25)

The present invention relates to missile exercise and test vehicles and more particularly to a test vehicle launched from the water surface for checking surface missile launcher equipment and for personnel training.

This application is related to application Serial No. 123,911, filed July 13, 1961, for Launch and Underwater Trajectory Test Vehicle, now U.S. Patent No. 3,075,301, and application Serial No. 132,246, filed August 17, 1961, for Underwater Pitch-Over Launch Test Vehicle, now U.S. Patent No. 3,075,302, both by Willy A. Fiedler and Joseph E. Madden, and assigned to the same assignee as the instant application.

In recent years, missiles capable of being launched from mobile sea bases have come to play a vital role in our national defense. In the course of developing such missiles, a need has arisen for an economical and reuseable exercise and test vehicle, whose cost is only a small fraction of the tactical vehicle being simulated, and which possesses the same weight and external configurations of the tactical propulsive missile. Such a "dummy" missile or dolphin should be useful for launcher equipment checkout and personnel training. An additional problem confronting designers of such exercise and test vehicles has been the quest for a vehicle capable of eliminating fallback of the non-propulsive test vehicles upon vertical or inclined, fixed or moving, surface launchers aboard ships, surfaced submarines or docks, after single or salvo launchings, even in the presence of high adverse winds. Those concerned with the development of such sea launched missiles have long recognized the need for such test and exercise vehicles. The present invention fulfills this need.

The general purpose of this invention, therefore, is to provide a non-propulsive test and exercise vehicle capable of duplicating performance characteristics of the tactical missile simulated in regard to launching while simultaneously minimizing the danger of launcher damage due to vehicle fallback. To attain these features, the present invention contemplates a new and improved ballasting and deballasting system which closely simulates the tactical missile for launching purposes and produces the required over-turning moments and lateral forces on the test vehicle, following launch, to cause the test vehicle to perform a trajectory with its fallback point a considerable distance from the launcher and with a fallback attitude resulting in an underwater path away from the launcher. By virtue of such deballasting between initial launching and surface impact, impact loads and, hence, test vehicle damage are greatly reduced since impact weight is only a small percentage of initial launch gross weight. Also contemplated within the scope of the invention are new and improved means to render the test vehicle buoyant following deballasting, thereby facilitating recovery of the vehicle for subsequent further testing and use.

Accordingly, one object of the present invention is the provision of a new and improved surface launched exercise and test vehicle.

Another object is to provide a surface launched exercise and test vehicle possessing the same weight and external configuration of the reference propulsive missile simulated.

An additional object is to provide an improved surface launched exercise and test vehicle which minimizes the danger of fallback upon the test vehicle launcher.

A further object of the instant invention is the provision of a surface launched exercise and test vehicle whose weight is rapidly reduced following launching to minimize the effects of fallback impact upon the test vehicle.

Still another object is to provide a test vehicle which is rendered buoyant, following test, to facilitate recovery.

Yet another object of the present invention is the provision of a surface launch test vehicle incorporating a new and improved ballasting and deballasting system.

A still further object is to provide a new and improved surface launched test and exercise vehicle which simulates a tactical vehicle in a simple and economical manner and which is both readily recoverable and reuseable.

Yet an additional object of the instant invention is to provide a surface launched test and exercise vehicle which performs a flight trajectory with its impact point a considerable distance from the launcher and a fallback attitude resulting in an underwater path away from the launcher.

Other objects and many of the attendant advantages of this invention will be readily appreciated as the same becomes better understood by reference to the following detailed description when considered in connection with the accompanying drawings wherein:

FIG. 4 is a sectional view of the cone structure of the surface launch test vehicle of the instant invention, the section being taken at a right angle to the view of this cone structure shown in FIGS. 2 and 3;

FIG. 5 is a sectional view of the deballasting piston assembly at the termination of deballasting action;

FIG. 6 is a sectional view taken substantially along the line 6—6 of FIG. 3;

FIG. 7 is a sectional view taken substantially along the line 7—7 of FIG. 3;

FIG. 8 is an elevation view of a typical energy release mechanism and timing device utilized for initiating deballasting, portions being broken away; and FIG. 9 is a perspective view of an accumulator membrane used in conjunction with the energy release mechanism of FIG. 8.

Figure 1:
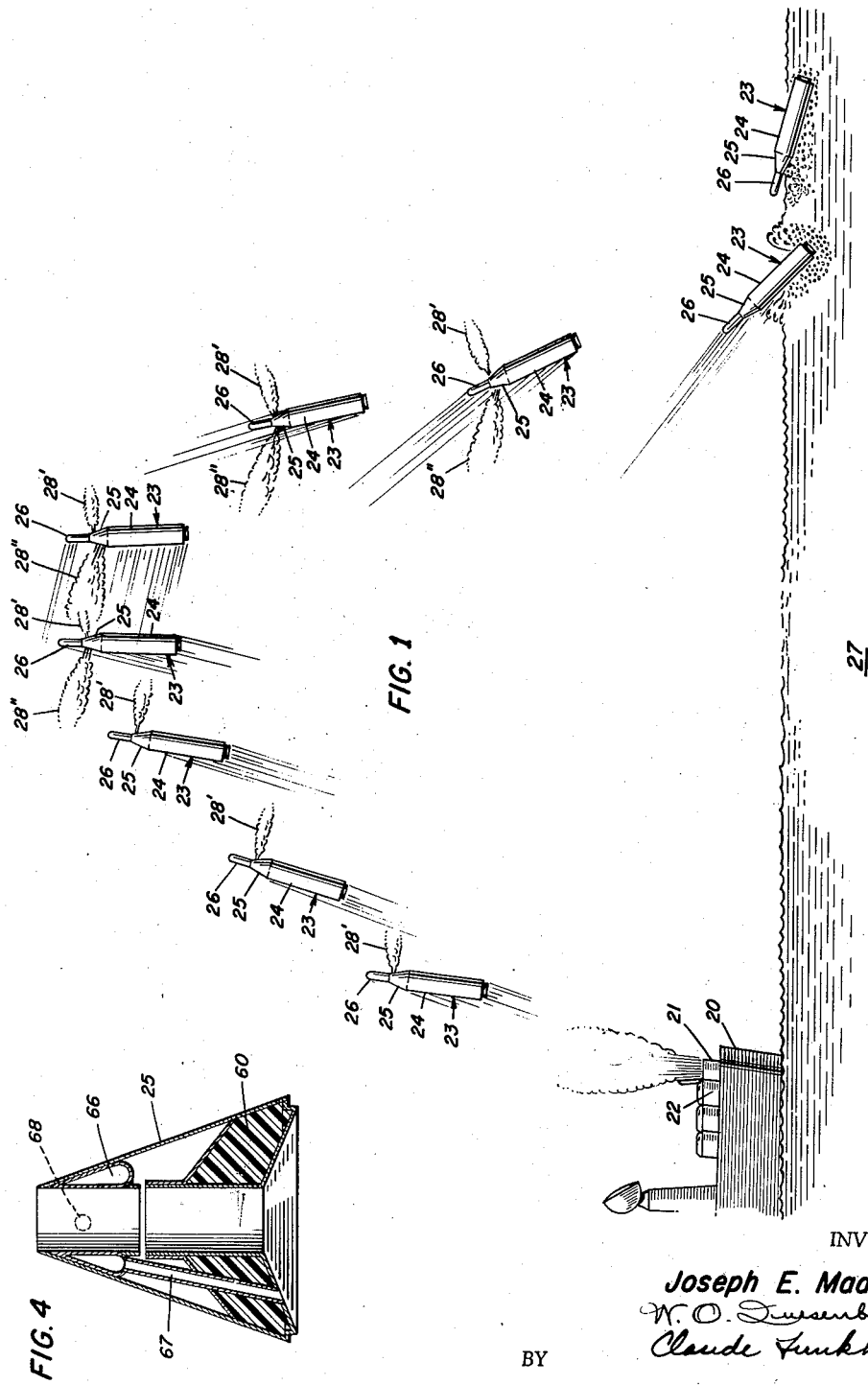
FIG. 1 illustrates a typical operational sequence for the surface launch test vehicle of the instant invention and depicts successive positions of the test vehicle following launch.

Referring now to the drawings, wherein like reference characters designate like or corresponding parts throughout the several views, there is illustrated in FIG. 1 of the drawings a typical operational sequence for one embodiment of the surface launch test vehicle of the instant invention. FIG. 1 shows a surface launching device such as a ship 20, but which may take the form of any suitable launching assembly, either mobile or stationary. The ship 20 is depicted as having a plurality of launching tubes 21 and 22 from which the launch test vehicle 23 may be launched. The test vehicle 23 is shown in FIG. 1 just after launch from tube 21 of the submarine 20. The test vehicle 23 comprises a main body shell portion 24 and a cone portion 25. The test vehicle 23 is launched from tube 21 by suitable fluid pressure means, not shown, and is ejected in a trajectory which is slightly inclined with respect to the vertical to prevent fallback upon the launcher. Initial deballasting of the fluid body 28 begins just as the test vehicle 23 emerges from the launch tube 21 with ballast ejection in the lateral direction from the longitudinal axis of test vehicle 23. Maximum flow by lateral ejection is obtained when the test vehicle base is above the muzzle of the launch tube 21 and the inertial forces are removed. The angular momentum imparted to the test vehicle 23 due to the lateral water ejection continues to increase for a prescribed period of time. At a designated instant, a timer device activates an energy release mechanism to initiate the second phase of deballasting. The resultant velocity vector after deballasting has a horizontal component yielding an acceptable range even in adverse winds. The original lateral deballasting impulse exerted on test vehicle 23 is such as to produce an overturning moment on the test vehicle 23, which is subsequently reduced by the second phase of deballasting. The vehicle thus enters the water 27 base first and fishtails away from the launcher.

Figure 2:
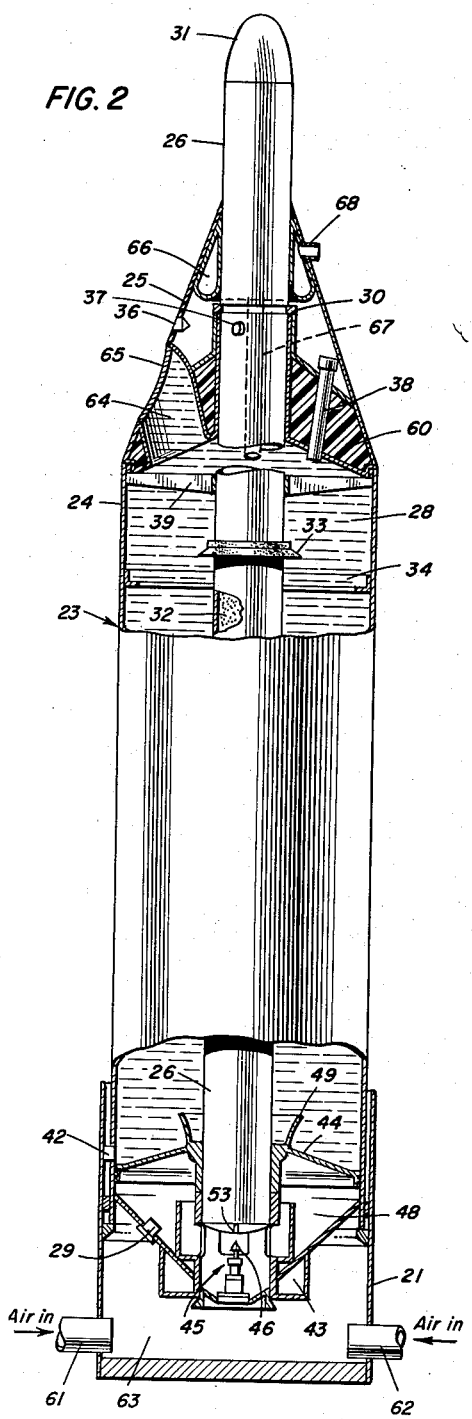
FIG. 2 is an elevation view of a ballasted surface launch test vehicle in accordance with one embodiment of the invention, portions being broken away to show internal structure in greater detail.
Figure 3:
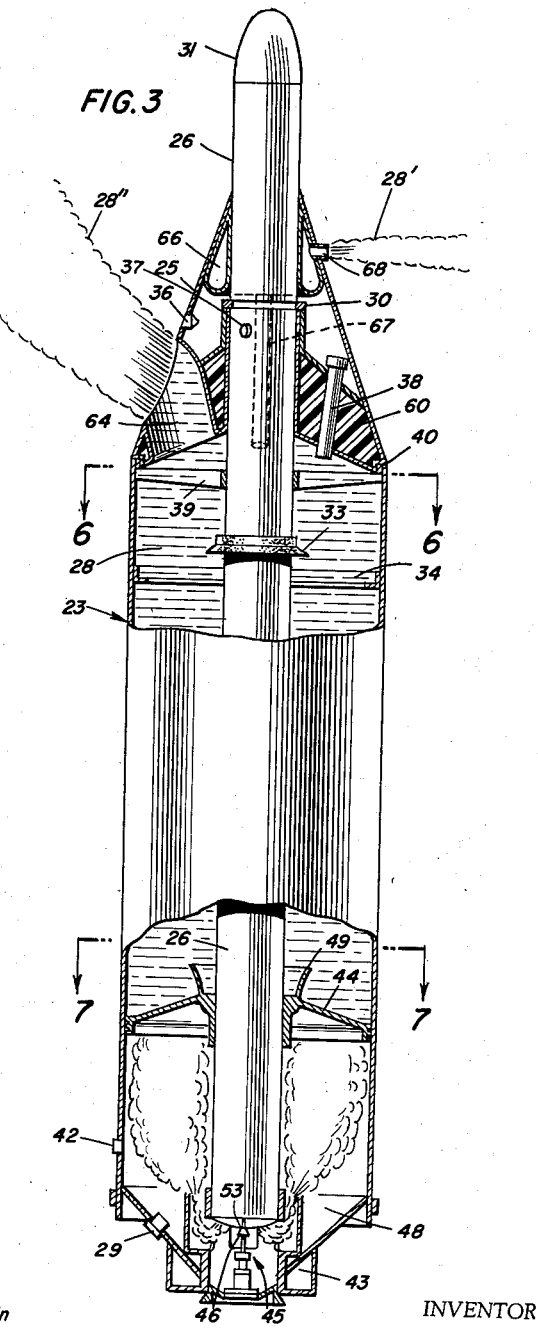
FIG. 3 is an elevation view of the test vehicle shown in FIG. 2 and illustrates internal structure during deballasting action.

FIGS. 2 and 3 depict in elevation a surface launch test vehicle, in accordance with the instant invention and suitable for performing an operational sequence as shown in FIG. 1 of the drawings. The test vehicle shown, though designed primarily for use with a water ballast, may utilize any other suitable inexpensive fluid ballast without departing from the spirit and scope of the present invention and weighs approximately half as much as the tactical missile simulated when empty. The use of water as a ballast medium for attaining the equivalent launch weight of the simulated tactical missile provides an inexpensive and easily ejected material for making the test vehicle 23 buoyant after completion of the launch test. The test vehicle 23 illustrated in FIGS. 2 and 3 of the drawings comprises five principal components which are a main shell 24, a central spine 26, a deballasting piston 44, a truncated cone 25, and a forebody 31.

The main shell 24 of the test vehicle 23 is a right circular cylinder, which may be of metal, plastic or any other suitable structural material, and has the reference missile's exterior dimensions for this section. The aft end of the main shell 24 is closed by a piston 44 and any suitable bottom closure structure which may, in one embodiment, be formed to simulate the motor nozzles of a tactical vehicle. The forward end of the main shell 24 contains a spider assembly 39 which supports and concentrically aligns the central spine 26 with respect to the main shell 24. The main shell 24 also accommodates a forward sealing ring 34, of metal or the like, which is utilized for sealing the outer circumference of a deballasting piston 44 at the end of its travel during the deballasting stroke along spine 26. The main shell 24 is adapted to receive and contain a suitable fluid ballast 28, such as water or the like, and is provided with a drain plug device 42 at its aft end for use whenever removal of the fluid ballast 28 is desired.

The main shell 24 is also provided with a one-way check valve 29 in the base of the test vehicle 23 to admit fluid pressure from the launch tube 21 to the interior of the test vehicle and below the deballasting piston 44. The spine 26 is a central tube or cylindrical structure running nearly the full length of the test vehicle 23. The spine 26 has provisions for attaching a head or forebody 31, which may be either ballasted or instrumented for evaluation data, as its forward end. A large portion of the spine 26 consists of an air accumulator cavity 32 containing a pressure rupture membrane 47 at its bottom or aft end. The spine 26 is provided with a gas charge valve or filler cap 37 at its top. Of course, it should be noted that a solid propellant gas generator, not shown, could be readily substituted for the air accumulator energy source in spine 26, with other components of the test vehicle 23 remaining essentially the same. The outer surface of the spine 26 acts as a guide for the deballasting piston 44. The lower end of the spine 26 positions rupture membrane 47 of the accumulator 32 adjacent a mechanically or pyrotechnically activated energy release device 45, provided with a piston knife 46, which is activated at a suitable time to cause rupture of the membrane 47 and thereby release the compressed air from the accumulator 32 into a plenum or expansion chamber 48. The release of compressed air from the accumulator 32 into plenum chamber 48 forces piston 44 upward along the spine 26 and main shell 24 to cause deballasting of the water or other fluid 28 stored within the main shell 24.

FIG. 2 of the drawings depicts the internal structure of the test vehicle 23 prior to initiation of deballasting and emergence of the test vehicle 23 from the launch tube 21 under the influence of a fluid pressure medium introduced to the interior 63 of launch tube 21 via suitable inlet means 61 and 62. In contrast, FIG. 3 of the drawings illustrates the internal structure of the test vehicle 23 some time after emergence or ejection from launch tube 21 and immediately following rupture of the accumulator membrane 47 which releases compressed air into the plenum chamber 48 to force the piston 44 upward along the spine 26 and effect deballasting of the test vehicle 23 via ejection of the stored fluid body 28. The spine 26 shown in FIGS. 2, 3, and 5 of the drawings also contains a forward snubber seal ring 33, shown in greater detail in FIG. 5 of the drawings, to seal the inner circumference of the deballasting piston 44 at the termination of the latter piston's forward travel along spine 26 and main shell 24.

FIG. 5 shows the piston 44 in the post-stroke position at the end of the deballasting operation. The piston 44 is a disc comprised of a suitable light material, such as aluminum or the like, which fits slidingly around the spine 26 and extends outwardly to the main shell 24. The piston 44 is shown as incorporating two sets of seal rings 50 and 51, of rubber, silicone plastic, or the like. The principal functions of the piston assembly 44 are to drive out the ballast fluid 28, to act as a closure in the forward post-stroke position for rendering the test vehicle 23 buoyant following deballasting procedures, and, in the aft position, prior to deballasting initiation, to prevent the bypass of water into the air expansion or plenum chamber 48 of test vehicle 23. In its forward sealing position, piston 44 is stopped by the forward seal ring 34 mounted on main shell 24 and is also sealed by seal ring 33 mounted on the spine 26. The forward seal ring 33 on spine 26 may either be of a suitable rubber or plastic material, or the like, to snub and hold the piston 44 in its sealing position, or the ring 33 may be of a less flexible material, such as metal or the like, the piston 44 being in this latter instance held against forward seal rings 33 and 34 by residual gas pressure on its underside. Both of these alternative methods of maintaining the piston 44 in the forward sealing position are considered equally effective in preventing sea water from entering the main shell 24 of test vehicle 23.

Referring now again to FIG. 2 of the drawings, the cone 25 is shown to be a water tight frustum which mounts upon the central spine 26 and is secured thereto by means of a spine attach clamp 30. Cone 25 attaches to the main shell 24 by means of a simple joint 40. The cone 25 contains a ballast fill tube 38 and an access door, not shown, to enable ready access to the gas charge valve 37 in spine 26 and the ballast fill tube 38. Deballasting of the fluid body 28 through cone 25 is accomplished through a pair of deballasting ports or tubes 68 and 64 in cone 25. As previously indicated for the operational sequence as shown in FIG. 1 of the drawings, deballasting first occurs through the lateral nozzle deballasting tube 68. Water first begins to emerge from the nozzle 68 in a lateral direction when the vehicle emerges from the launch tube 21. This occurs via fluid pressure in the launch tube 21 gaining access from the area 63 of launch tube 21 to plenum chamber 48 within test vehicle 23 and below the deballasting piston 44. Pressure from 63 into plenum chamber 48 is admitted via the one-way check valve 29 in the base of the test vehicle 23. The launch tube pressure is sufficient to move piston 44 upwards and thereby causes water to fill the cone tubes 66 via conduit tube 67 and thereby initiate deballasting through lateral nozzle 68 to produce the overturning moment indicated in FIG. 1 of the drawings. However, the launch tube pressure is insufficient to cause ejection of the cover 65 of inclined deballasting tube 64, and, therefore, deballasting through inclined deballasting tube 64 does not begin until the energy release mechanism 45 enables release of pressure from the accumulator 32 in spine 26. Cone 25 is also provided with an alignment window 36 to enable proper alignment of the test vehicle 23 in the launch tube prior to actual launch. Insulation 60, of foam or the like, is also provided in cone 25 to limit the exit passage of the deballasting fluid body 28 through cone 25 solely to inclined deballasting tube 64 and lateral deballasting tube 68 via the internal conduit tube 67.

FIG. 3 of the drawings illustrates the test vehicle 23 at that point in the operational sequence when deballasting of the fluid body is being carried out through both nozzles 68 and 64. The deballasting fluid column from lateral nozzle 68 is referred to as 28' and that from inclined deballasting tube 64 is depicted as 28".

FIG. 4 of the drawings is a sectional view of the cone structure depicted in FIGS. 2 and 3 of the drawings and is turned 90° from the cone structure shown in FIGS. 1 and 2 to illustrate conduit 67 in greater detail.

The forebody or nose cone 31 of the test vehicle 23 is attached to the extreme forward end of the spine 26 in FIG. 2 and may contain either metal or concrete ballast, if the test vehicle 23 is to be used for personnel training or launcher testing purposes, or the forebody 31 may contain an instrumentation package which records in-tube vehicle motions during launch of the test vehicle 23 from the launch tube 21.

FIG. 6 of the drawings is a sectional view taken substantially along the line 6—6 of FIG. 3 and shows in detail the structure of the spider assembly 39 which supports and centrally aligns the spine 26 with respect to the main shell 24. The spider 39 is shown to comprise a plurality of rib sections 52 which provide axial rigidity for the main shell 24 as well as a suitable passage for ballast fluid entering via the ballast fill tube 38 shown in FIG. 2.

FIG. 7 is a sectional view taken substantially along the line 7—7 of FIG. 3 and, when considered in combination with FIG. 5, illustrates in detail the structure of the deballasting piston 44. The piston assembly 44 is shown to include a flared cup section 49 which acts in conjunction with the forward seal ring 33 to provide a variable-orifice water trap for effectively decelerating the piston 44 during the latter portion of the deballasting stroke.

FIG. 8 depicts in greater detail the timing and energy release mechanism 45 shown in FIGS. 2 and 3 of the drawings. The mechanism 45 is shown to comprise a pair of timers 55 and 56 which may be either accelerometer controlled, that is, responsive to in-tube acceleration, or merely clock type devices responsive to passage of time from a prescribed reference. The timers 55 and 56 activate suitable pyrotechnic devices or cartridges 57 and 58 to cause rapid gas expansion in a firing chamber 54. The latter increase in gas pressure causes shear pin 59 to shear and expels the piston knife 46 into the membrane 47 of the accumulator 32 housed within spine 26. Of course, spring propulsion or other mechanical driving means may be utilized to expel the piston knife 46 without departing from the spirit and scope of the instant invention and the depicted pyrotechnic embodiment is to be considered solely as illustrative. Moreover, the use of a single timing mechanism in lieu of the dual timers 55 and 56 is likewise contemplated by the present invention.

FIG. 9 illustrates a rupture membrane 47 mounted at the aft end of the spine 26. The rupture membrane 47 is fabricated of a soft metal, such as Monel or the like, and is scored with radial grooves 53 in alignment with the blades of the piston knife 46 to insure positive penetration of the membrane 47 via the knife 46 without fragmentation.

Additional ballast for the test vehicle 23 may be placed at any convenient location in the vehicle such as in the simulated nozzle area 43 shown in FIG. 2 of the drawings, or in the main shell 24, and may consist of any suitable ballast material such as concrete or metal, or the like.

The test vehicle of the instant invention provides economical and reusable means for testing surface launching devices and for training personnel. The test vehicle simulates the tactical vehicle by possessing the same weight and external configurations of the reference propulsive missile being simulated. The deballasted vehicle weighs only a small part of its launch weight to minimize its fallback impact and has a resultant velocity vector, after deballasting, having a horizontal component yielding an acceptable range, even in adverse cross winds, as well as a component which causes the test vehicle to enter the water base first and fishtail away from the launcher, thereby further minimizing fallback danger to the launcher. The test vehicle is also rendered buoyant upon completion of its test sequence and the latter feature of buoyancy enables ready recovery for subsequent reuse.

Obviously, many modifications and variations of the present invention are possible in the light of the above teachings. It is therefore to be understood that, within the scope of the appended claims, the invention may be practiced otherwise than as specifically described.

What is claimed is:

1. A launch test vehicle to be fired from a surface launcher into a trajectory which terminates in water entry, said vehicle comprising a shell structure having the same weight and external configurations of the tactical missile being simulated, a fluid ballast contained by said shell structure, a first deballasting tube for producing an overturning moment upon said test vehicle, a second deballasting tube for producing a horizontal displacement of said test vehicle away from said launcher and for partially counteracting said overturning moment introduced by said first deballasting tube, deballasting means to eject said fluid ballast initially from said first deballasting tube alone and then simultaneously from both of said first and second deballasting tubes, and means for rendering said test vehicle buoyant following deballasting, whereby the mass of said vehicle is rapidly dissipated during flight and said test vehicle fishtails away from said launcher upon entry into the water and may be readily recovered in its buoyant state.

2. A launch test vehicle to be fired from a surface launcher into a trajectory which terminates in water entry, said vehicle comprising a main body structure, a fluid ballast contained by said main body structure, a cone structure, means for fixedly attaching said cone structure to said main body structure, first and second deballasting tubes in opposite sides of said cone structure, the axis of said first deballasting tube being at right angles to the longitudinal axis of said test vehicle, the axis of said second deballasting tube being inclined at an acute angle with respect to the longitudinal axis of said test vehicle, a pressure cover for said second deballasting tube, deballasting means to eject said fluid ballast initially from said first deballasting tube alone then simultaneously from both of said first and second deballasting tubes and to render said test vehicle buoyant, and means to energize said deballasting means for dual tube deballasting at a prescribed point in said vehicle trajectory, whereby the mass of said vehicle is rapidly dissipated during flight and said vehicle fishtails away from said launcher upon water entry where it may be readily recovered in its buoyant state.

3. A launch test vehicle to be fired from a surface launcher into a trajectory which terminates in water entry, said vehicle comprising a main body structure, a cone structure, means for fixedly attaching said cone structure to the forward end of said main body structure, first and second deballasting tubes in opposite sides of said cone structure, the axis of said first deballasting tube being at right angles to the longitudinal axis of said test vehicle, the axis of said second deballasting tube being inclined at an acute angle with respect to the longitudinal axis of said test vehicle, a pressure cover for said second deballasting tube, deballasting piston means within said main body structure to eject said fluid ballast initially from said first deballasting tube alone and then simultaneously from both said first and second deballasting tubes, gas pressure means for driving said deballasting piston means, sealing means within the forward end of said main body structure to seal said deballasting piston means upon completion of deballasting and to render said vehicle buoyant, timer means to energize said gas pressure driving means for dual tube deballasting at a prescribed point in said vehicle trajectory, whereby the mass of said vehicle is rapidly dissipated during flight and said vehicle fishtails away from said launcher upon entering the water and may be readily recovered in its buoyant state.

4. A launch test vehicle to be fired from a surface launcher into a trajectory which terminates in water entry, said vehicle comprising a cylindrical main body shell, a fluid ballast contained by said main body shell, a central spine supported in coaxial alignment with said main body shell, a frustrum of a cone structure fixedly supported in engagement with said spine and said main body shell, the axis of revolution of said cone structure being coaxial with said spine and said main body shell, first and second deballasting tubes in opposite sides of said cone structure, the axis of said first deballasting tube being at right angles to the longitudinal axis of said test vehicle, the axis of said second deballasting tube being inclined at an acute angle with respect to the longitudinal axis of said test vehicle, a pressure cover for said second deballasting tube, piston deballasting means for ejecting said fluid ballast first from said first deballasting tube alone then simultaneously from both of said first and second deballasting tubes, said piston deballasting means being located within said main body shell and in sliding engagement with said central spine and the interior of said main body shell, sealing means at the forward end of said main body shell for rendering said test vehicle buoyant upon ejection of said fluid ballast by said piston deballasting means, gas pressure means for driving said deballasting means, timer means, and means responsive to said timer means to actuate said gas pressure means at a prescribed point in said vehicle trajectory, whereby the mass of said vehicle is rapidly dissipated during flight and said vehicle fishtails away from said launcher upon entry into the water where it may be readily recovered in its buoyant state.

5. The test vehicle of claim 4 wherein said fluid ballast is water.

6. The test vehicle of claim 4 wherein said gas pressure means includes a source of high pressure air.

7. The test vehicle of claim 4 wherein said gas pressure means includes a one-way check valve in the base of said test vehicle to admit gas pressure from said launcher to said deballasting piston means, a pressurized air-filled accumulator cavity within said spine and a rupture membrane at the base of said spine, and said timer responsive means includes a piston knife adapted to pierce said rupture membrane.

8. The test vehicle of claim 4 wherein said sealing means includes a first piston sealing ring mounted concentrically along the interior wall of said main body shell and a second piston sealing ring mounted concentrically on the outer wall of said spine.

9. The test vehicle of claim 4 wherein said timer means includes an accelerometer device responsive to test vehicle motion.

10. The test vehicle of claim 7 wherein said rupture membrane is scored in alignment with the blades of said piston knife to eliminate fragmentation.

11. The device of claim 7 wherein said piston knife is pyrotechnically actuated by said timer means to pierce said rupture membrane.

12. The device of claim 8 wherein the forward end of said piston deballasting means possesses a cup flare providing a variable-orifice fluid trap with said second piston sealing ring, whereby said piston deballasting means is decelerated during the latter portion of its travel along said spine and said main body shell.

References Cited in the file of this patent
UNITED STATES PATENTS
3,007,372   Baxter _____ Nov. 7, 1961
3,010,444   Finnigan _____ Nov. 28, 1961